(No Model.) 2 Sheets—Sheet 1.

S. W. ALLEN.
OPTICAL LANTERN.

No. 594,819. Patented Nov. 30, 1897.

WITNESSES:
Henry J. Dobbin
Henry S. Reade.

INVENTOR
Samuel Wesley Allen
BY
James A. Whitney
ATTORNEY (No Model.) 2 Sheets—Sheet 2.
S. W. ALLEN.
OPTICAL LANTERN.
No. 594,819. Patented Nov. 30, 1897.
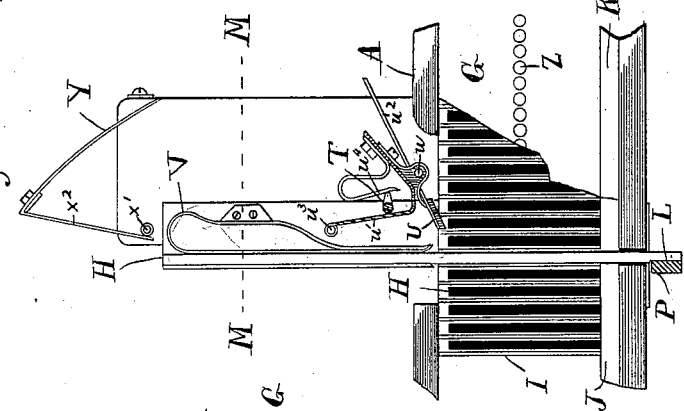
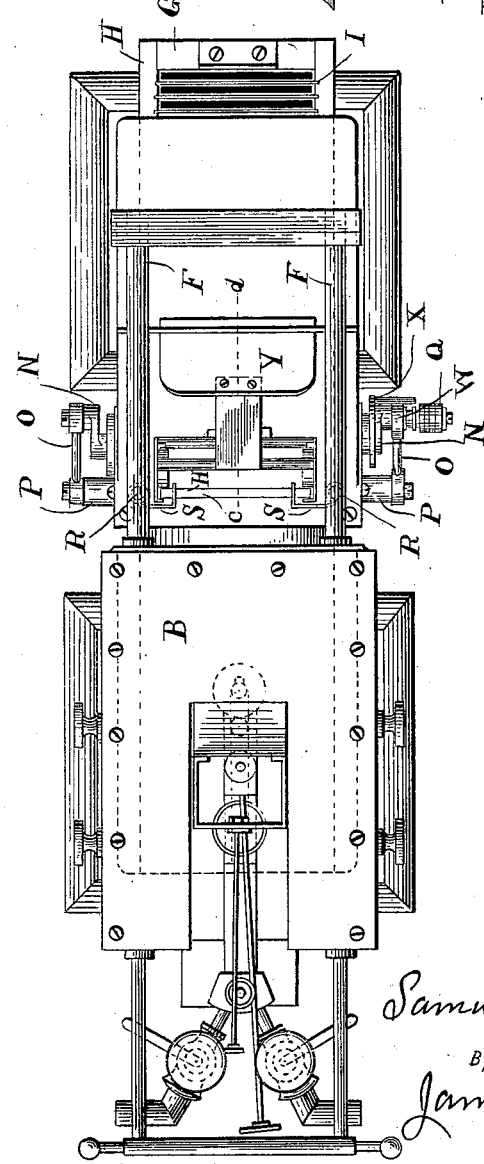
WITNESSES:
Henry J. Dobbins
Henry S. Reade
INVENTOR
Samuel Wesley Allen
BY
James A. Whitney
ATTORNEY

UNITED STATES PATENT OFFICE.

SAMUEL WESLEY ALLEN, OF NEW YORK, N. Y.

OPTICAL LANTERN.

SPECIFICATION forming part of Letters Patent No. 594,819, dated November 30, 1897.

Application filed July 16, 1895. Serial No. 556,198. (No model.)

*To all whom it may concern:*

Be it known that I, SAMUEL WESLEY ALLEN, a subject of the Queen of Great Britain and Ireland, residing in the city, county, and State of New York, have invented certain new and useful Improvements in Optical Lanterns; and I do hereby declare that the following is a full, clear, and exact description of the same, reference being had to the accompanying drawings, making a part of this specification, in which—

Figure 2:
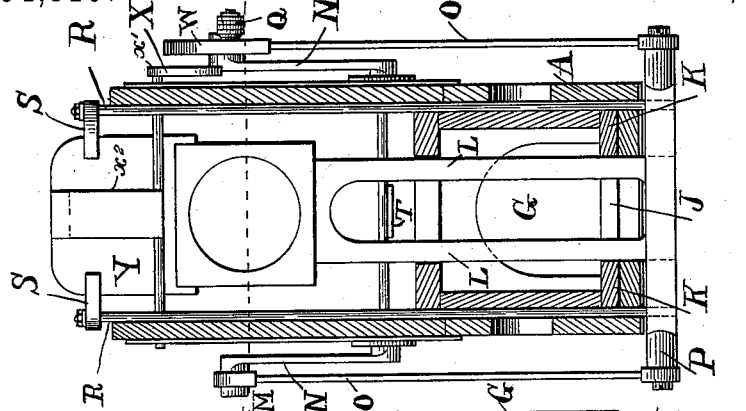
Figure 1:
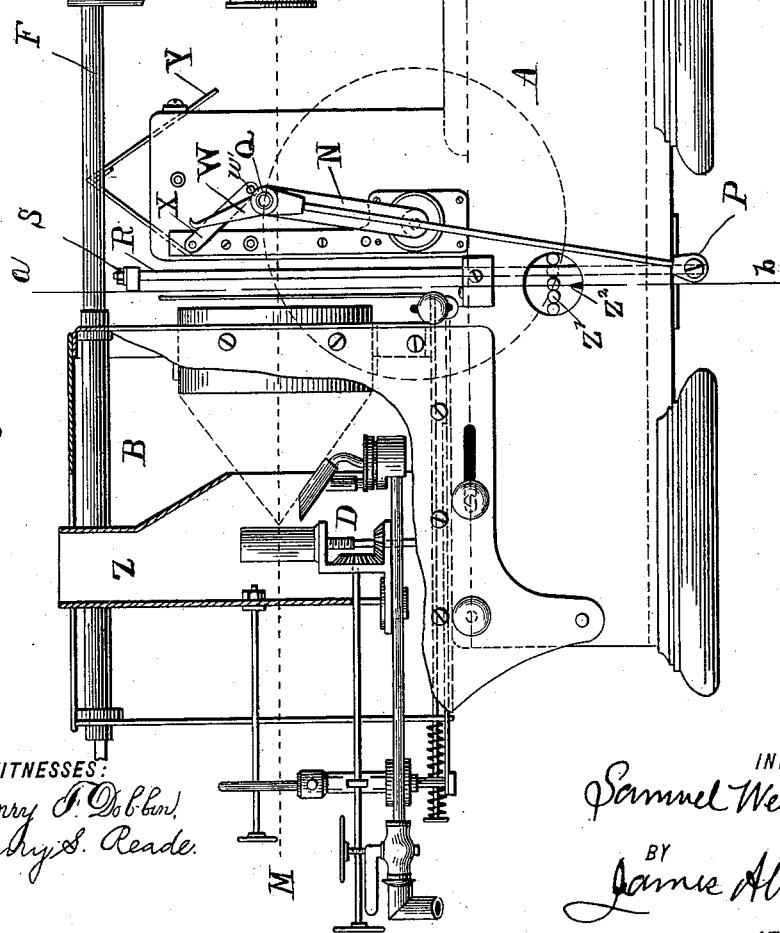

Figure 1 is a partial sectional view of an apparatus embracing my said invention. Fig. 2 is a sectional view of the same, taken in the line $a\,b$ of Fig. 1. Fig. 3 is a plan view of the same. Fig. 4 is a sectional view of a part thereof, taken in the line $c\,d$ of Fig. 3.

Heretofore in the delivery of lectures illustrated by magic-lantern or stereopticon views it has usually been necessary that a skilled operator be employed in attendance upon the lecturer to operate the lantern.

The object of my invention is to provide efficient means whereby the lecturer himself, by the simple manipulation of a handle, may cause the slides to be automatically transferred to and brought away from the optical system of the lantern in such succession and at such times as may be appropriate to the context and character of his discourse. My invention comprises certain novel combinations of parts whereby this object is attained, with the results of dispensing with a special operator or attendant and placing the display of the views directly under the personal control of the lecturer.

Referring now to the drawings, A is a rectangular box upon which stands the optical portion of the lantern.

B is the body of the lantern, containing the condenser C and the illuminant D.

E is the objective or projecting lens, attached to a front board, which is in its turn secured to the ends of a pair of telescopic tubes F.

The main feature of this invention is the sliding drawer or magazine-chamber G, within which are placed any number of transparencies H, according to the length of the drawer G. Each transparency drops easily into its place, and they are separated from each other by transverse divisions I, fitted into the drawers at equal distances apart for its entire length, the bottom part of the drawer being partially open for its entire length, as shown at J, leaving longitudinal strips K along the bottom, upon which the slides or transparencies rest. The drawer thus filled with slides is made to pass easily through the outer casing A, and the bottom portion of the drawer at J being partly open allows a free upward passage of a plunger L, which pushes each transparency upward as far as the optical center M, the plunger L being operated by cranks N N and connecting-rods O O, a cross-head P being attached to the plunger L, so that when the cranks are revolved by turning the handle Q the plunger reciprocates vertically according to the length of the stroke of the cranks N.

Guide-rods R R are attached to the cross-head P and passed upward through openings in the side of the rectangular box A, projecting arms S S being secured to the tops of the guide-rods R for the purpose of forcing the slide or transparency downward and back into its former position in the magazine-chamber or drawer G.

The drawer G is fed forward the extent of the distance of each slide apart by means of a cam T upon the center spindle of the cranks N, a pawl or ratchet U, Fig. 4, engaging with the metal divisions I, the motion taking place immediately the plunger L is down and clear of the slide and nearly at the bottom of its stroke.

As shown in Fig. 4, the pawl U is pivoted at $u$ to a frame $u'$ and is provided with a finger-piece $u^2$, the pawl U being of sufficient weight to fall into the spaces between the partitions I, while the finger-piece enables the operator to raise the pawl when it is desired to slide the box or drawer freely. The frame $u'$ is pivotally supported at $u^3$ and is provided with a wall preferably consisting of a spring-plate $u^4$. As the cam T rotates it operates alternately against the spring-plate or wall $u^4$ and the vertical portion of the frame $u'$, so as to oscillate the latter on the pivot $u^3$ and cause the pawl to move back and forth, the said pawl engaging behind the upper edge of one of the partitions I and feeding the drawer G forward.

It will be seen that by revolving the handle

Q the magazine-chamber will be fed forward at each revolution, the plunger L carrying the slide right up into position and the projecting arms S carrying the slide downward again, and so on until each slide has been exhibited, a spring arrangement V, Fig. 4, holding the slide up in position.

A projecting arm or hook W at the top of one of the connecting-rods O engages with a pin $w'$ upon the end of lever X, which is pivoted at $x'$ and is provided with an arm $x^2$, at the end of which is a depending ground-glass or celluloid screen Y. When the arm or hook W engages the pin $w'$, it causes the screen to rise, as indicated in Fig. 1, and disclose the slide which has been raised to position for exhibition. A further movement causes the arm or hook W to pass the pin, and the screen then drops when the crank is being revolved and the transparency removed and replaced by another.

Z, Figs. 1 and 2, is a shield within which the jet is placed, an opening in the top conveying the flame and heat to the outside of the lantern.

Suitable indicator-figures may be placed on the side of the box or drawer G to show through an opening $Z'$ in the box A, an indicating-point being placed, as at $Z^2$, to coöperate with such figures.

In Fig. 2, which is a section of the apparatus at $a\ b$, Fig. 1, the plunger L is shown in position having pushed the slide H up, the plunger L being attached to the cross-head P and operated by the cranks N, connected to the cross-head P by the connecting-rods O. The mechanism is manipulated by the handle Q, this being also the case with the dissolver arrangement, as already described. The arms S on the top of the guide-rods R are for bringing the slide H back into the magazine-chamber or drawer G.

What I claim as my invention is—

1. In an optical lantern, the combination with the box and slides thereof, of a plunger passed through said box and arranged to raise said slides, a movable screen, and connections between said plunger and screen whereby reciprocations of the plunger operate to raise the screen and permit it to drop.

2. In an optical lantern, the combination with a slide box or rack arranged to be moved longitudinally below the lantern proper, of a plunger movable vertically through said box to elevate the slides out of the box, means for forcing the slides back to position in said box, a movable screen, and connections between said plunger and screen whereby reciprocations of the plunger operate to raise the screen and permit it to drop.

3. In an optical lantern, the combination with a slide box or rack arranged to be moved longitudinally below the lantern proper, of a plunger movable vertically through said box to elevate the slides therefrom, means for forcing the slides back to position in said box, pawl mechanism for advancing the box intermittently, a movable screen, and connections between said plunger and screen whereby reciprocations of the plunger operate to raise the screen and permit it to drop.

SAMUEL WESLEY ALLEN.

Witnesses:
JNO. C. MCQUHAE,
HENRY S. READE.